United States Patent [19]

Anderson et al.

[11] Patent Number: 4,658,430
[45] Date of Patent: Apr. 14, 1987

[54] SYSTEM FOR ROTATING BINARY IMAGES

[75] Inventors: Karen L. Anderson, Peekskill; Joan L. Mitchell, Ossining, both of N.Y.

[73] Assignee: International Business Machines Corp., Armonk, N.Y.

[21] Appl. No.: 686,788

[22] Filed: Dec. 27, 1984

[51] Int. Cl.⁴ .............................................. G06K 9/00
[52] U.S. Cl. ...................................................... 382/46
[58] Field of Search .................... 382/46, 56; 340/727; 358/261; 364/521

[56] References Cited

U.S. PATENT DOCUMENTS 4,052,699 10/1977 Micka et al. ......................... 382/46
4,168,488 9/1979 Evans .................................. 382/46
4,225,929 9/1980 Ikeda ................................. 340/727

FOREIGN PATENT DOCUMENTS

0137147 4/1985 European Pat. Off. .............. 382/46
0149119 7/1985 European Pat. Off. .............. 382/46

Primary Examiner—Stephen A. Kreitman
Attorney, Agent, or Firm—Thomas P. Dowd

[57] ABSTRACT

A method and apparatus for converting an image in run representation form into a raster image which is rotated by some multiple of 90° from the orientation of the original image is disclosed wherein the original image data which is stored in run end or run length form may be divided and stored in discontiguous blocks. In implementing a 90° rotation, the image data is conceptually divided into vertical strips, each of which is independently rotated to create a horizontal strip of the output image. The rotation process is carried out by firstly converting the run representation image data to raster form, dividing the data in each row among a number of intermediate buffers, each of which contains the data from one vertical strip of the original image. The contents of each buffer are rotated and rearranged in an available buffer to form a horizontal strip of the rotated image ready for raster readout. Similarly, a convenient method of rotating the input image 180° is also described wherein the original image is read in run representation form a row at a time and the rows are converted to raster form and placed in storage in reverse order, with the order of the bits in each row also reversed.

20 Claims, 11 Drawing Figures

FIG. 1   Control Code for 180° Rotation

FIG. 2 Run End Conversion Loop

FIG. 3  90° Clockwise Rotation to Blocked Image

FIG. 4 Rotation of a Vertical Strip

FIG. 5  Control Code for 90° Rotation

FIG. 6 Run End Buffer Conversion

FIG. 7  Block Boundary Crossing for White Run

FIG. 8 Block Boundary Crossing for Black Run

FIG. 9 Rotation of Intermediate Raster Data

FIG. 10 System for 180° Rotation

FIG. 11 System for 90° Rotation

SYSTEM FOR ROTATING BINARY IMAGES

BACKGROUND OF THE INVENTION

1. Field of the Invention

The present invention relates to digital image processing methods and more particularly to a method and apparatus for handling encoded image data to rotate the image.

2. Description of the Prior Art

There is a considerable amount of prior art relating to methods for processing encoded image data to achieve rotation of the original image with respect to its orientation upon input to the encoding system. Varied examples are found in U.S. Pat. Nos. 3,968,475; 3,976,872; 4,052,699; 4,168,488; 4,225,929; and 4,271,476; as well as in EPO published patent application No. 081,096 and IBM Technical Disclosure Bulletins, Vol. 13, No. 11, April 1971, page 3267; and Vol. 18, No. 8, January 1976 at pages 2633 and 2640.

In applications where the output image is displayed in raster form the image data to be processed may not be immediately available in storage for readout in raster form, that is, each binary bit may not represent a picture element or pel of the original image. The data may, for example, be stored in a run end or run length form, that is, the binary coding is representative of the transition points between black and white on the original image. In run length coding the binary numbers are indicative of the width of each black and white segment in the line of an image, while the binary numbers in run end coding cumulatively indicate successive points of transition along the line. Such representations may be compacted by a procedure such as the CCITT compression standard. One such compaction scheme is described in copending U.S. patent application Ser. No. 571,239 now abandoned. This method includes both an encoder and a decoder. The decoder may be used to create run end representations of individual lines of an encoded image.

One method of rotating an image encoded in run representation form would be firstly to convert the coded data to raster image form using the method described in U.S. Pat. No. 4,596,039 and then using either the procedure described in copending U.S. patent application Ser. No. 567,214 or the procedure described in copending U.S. patent application Ser. No. 567,293 to rotate the image data in place. All of the preceding applications are assigned to the same assignee as the present application. While these methods are valuable in themselves, their combination would usually result in a great deal of movement of data, much of which would be unnecessary. A further problem is presented by the fact that the resulting procedure would probably be unsuitable for use on systems which allocate storage in blocks that are not large enough to contain an entire image. In such systems, the image must be split among several blocks and the rearrangements necessary for the 90° in situ rotation become very complicated. Consequently, for typical images, it would be more efficient to combine the steps of converting the image to raster form and rearranging the subunits (e.g., 8×8 pel blocks) of the image.

The present invention is directed to providing a system for combining the conversion and rearrangement of the run end or run length data and for subsequently reordering the data and rotating the subunits to create the final output images in raster form rotated by 90°, either clockwise or counterclockwise, or by 180° from the original image orientation.

The prior art cited above neither teaches nor suggests the present invention as disclosed and claimed herein.

SUMMARY OF THE INVENTION

The present invention solves the problem of taking an image in run representation form and creating a raster image which is rotated by some multiple of 90° from the orientation of the original image. It particularly involves the conversion of original image data which is stored in run end or run length form to permit it to be divided and stored in discontiguous blocks. For example, in implementing a 90° clockwise rotation, the number of rows in the original image data is padded to a multiple of eight so that the total number of rows may be expressed as 8N (where N is an integer). Each input row or line of the data will also be padded to a number of pels or bits that is divisible by eight. This image data is then conceptually divided into vertical strips of a selected width M, where M is a number of bytes such that 8NM (the number of bytes in the strip) is less than or equal to the number of bytes available for each storage block, as will be described. Normally, the image width will not be evenly divisible by M, so that the last vertical strip has a width M' which is less than or equal to M. Each vertical strip of the original image is then ready to be independently rotated to create a horizontal strip of the output image. The rotation process is carried out by firstly converting the run representation image data to raster form, preferably using the technique described in previously-cited U.S. Pat. No. 4,596,039. However, instead of storing the successive bytes of image data in contiguous locations, each byte is stored at an offset of 8N from the previous byte in the storage buffer. The first byte of the first row of a strip is stored at an offset of 8N−1 from the beginning of the storage buffer; the first byte of the second row is stored at an offset of 8N−2; and for each succeeding row of the strip the position of storage of the first byte is backed up by one byte. The resulting arrangement places the eight bytes forming each 8×8 bit block to be rotated in eight contiguous bytes of the storage buffer reading from the bottom of the bit block to the top. The data can be conveniently picked up and rotated using the table look-up/add procedure used in the method described in previously cited U.S. patent application Ser. No. 567,214, with appropriate modifications to compensate for the altered order of the input bytes, and the resulting eight bytes can be distributed to their proper places in the output image buffer. The rotation of a vertical strip of the image by this method requires a scratch buffer of the same size as the image strip.

To rotate an entire image, each bit row is converted from run representation form to raster form with the resulting bytes distributed among several buffers, each of which contains the data from one vertical strip of the original image. After all of the rows have been converted, the data from each buffer is rotated as described above to create a horizontal strip of the output image ready for raster readout. Since each strip of the image is processed independently and nonconcurrently, it is only necessary to have one extra buffer available, inasmuch as after the data from the first buffer is rotated into the extra buffer, the first buffer is no longer needed, and so the data from the second buffer can be rotated into the first buffer, the data from the third buffer can be rotated into the second buffer, and so on.

The described method will rotate the original or input image 90° clockwise into storage, rendering it ready for printout or display in that orientation. The mechanics of a counterclockwise rotation differ only in detail but not in concept from the described clockwise rotation procedure.

Similarly, a convenient method of rotating the input image 180° is also described wherein the original image is read in run representation form a row at a time and the rows are converted to raster form and placed in storage in reverse order, with the order of the bits in each row also reversed.

DESCRIPTION OF THE PREFERRED EMBODIMENTS OF THE INVENTION

Source images of the type to be operated upon with the method and apparatus of the present invention are typically documents or other material containing text or pictures in black and white or in a form that can be converted to black and white. These source images are scanned in photographic or raster form and thresholded, if necessary, to produce bilevel images that undergo suitable encoding, such as in accordance with CCITT standards, as is well known to those skilled in the art. The encoded images are then stored and/or transmitted for decoding and display in, for example, a teleconferencing system where the transmission means may be telephone lines. The received data may be decoded in run end or run length form. To convert this binary run end data to raster form, it is necessary to generate the bits so that each bit in a line of data represents a successive black or white picture element or pel in the output image.

A suitable system for creating a raster image from an image in run end form, as previously indicated, is described in copending application Ser. No. 567,292.

The system therein creates a raster image, and the rotation algorithms described in copending applications Ser. Nos. 567,214 and 567,293 may then be used to rotate the raster image in place or not in place. The present invention is an improvement on these procedures because it eliminates a great deal of the rearrangement of the data and because it may be used to create an image which does not occupy a single large block of storage, but rather may occupy a number of smaller blocks. The latter consideration is important when the procedures are to be implemented on a processor which allocates storage in small chunks, so that it is not practical to obtain a block of contiguous storage large enough to apply one of the rotation functions to the whole image. The present invention takes advantage of the fact that initially the image does not exist in raster form, allowing the process of creating a raster image to do some of the rearrangement required by the rotations.

However, even if the rotated image is to occupy a large area of contiguous storage, so that the combination of procedures cited above could be used, it will often be more efficient to apply the system of the invention to perform the two steps simultaneously. For the 180° rotation, this can be done by specifying that the list of output blocks includes one block that is large enough to contain the entire image. This approach will also work for the 90° rotations, but since one extra block is required and all blocks are assumed to be the same size it would require enough storage for two copies of the image. The storage requirement can be reduced by breaking the storage area allocated for the rotated image up into a number of smaller blocks, each large enough to contain exactly 8k lines of the rotated image (where k is some integer) with no space left over except possibly in the last block. The extra block required would then be smaller.

The preferred embodiments of the invention assume that the run representation form of the original (input) image is contained in a series of buffers, one buffer for each line or row of image data. For the purposes of description, each buffer will be assumed to contain a series of halfwords containing the run end data. It will be apparent to those skilled in the art that a run length representation could be used with minor changes to the procedure as described. The 16 bits in a halfword of run end data are adequate to represent images with widths up to 32K as positive displacements. The first halfword in each line buffer gives the number of bytes of run end data plus two bytes for the count (i.e. the total number of bytes of data in the buffer); this is followed by three zero run ends, an arbitrary number of pairs of white/black run ends, and two additional copies of the last black run end. If the image row begins with a black run, the first white run end must be specified as zero. If the image row ends with a white run, the last black run end will be the same as the last white run end, so that there are three copies of the last real run end. For example, the run end buffer containing the halfword entries 24 0 0 0 0 10 27 28 32 32 32 32

16 0 0 0 0 32 32 32 32

32 0 0 0 0 1 2 3 8 9 12 28 31 32 32 32
would correspond to the following bit image:
11111111 11000000 00000000 00010000
00000000 00000000 00000000 00000000
10100000 10001111 11111111 11110001

Run end buffers such as those described above may be obtained from various sources; for example, the decoder described in copending application Ser. No. 571,239 creates representations of image lines in this form, as does the method for converting raster data to run representation form described in copending application Ser. No. 567,218. The latter is assigned to the same assignee as the present application. Data may be fed into the procedure of the present invention one line at a time; the present invention does not require multiple lines (in run representation form) of the image to be rotated to be simultaneously available. The conversion of the run representation data to raster form by the present invention may be interleaved with the creation of the run representation data.

The simplest rotation is the 180° rotation. It is possible to perform this operation with an amount of effort roughly equivalent to that used to convert the image to raster form by an appropriate modification to the conversion procedure and a change in the processing order. In the normal conversion of an image in run representation to raster form, a pointer is positioned at the beginning of the storage allocated for the rotated (output) image. The first line of the input image is obtained, and the run end buffer is read from left to right as the runs are filled in in the output image moving from left to right. The pointer then addresses the beginning of the second line of the output image and the next line is converted. Processing continues, reading from the top of the image to the bottom for both the input and output images.

To rotate by 180° while converting to raster, parts of this process are reversed. A pointer is positioned at the end of the storage allocated for the output image. The first line of the input image is obtained. The run end buffer is read from left to right, but the runs are filled in in the output image moving from right to left, reversing the pattern of bits in the line described by the run end buffer. The output pointer is then positioned at the end of the next-to-last output line and the second input line is obtained and converted to raster form in the same manner. The process continues, working toward the top of the output image as the bottom of the input image is approached. When converting/rotating an image into multiple blocks of storage, the output pointer must be repositioned whenever it reaches the beginning of a block.

The details of the preferred embodiment of the 180° rotation will now be described with reference to FIGS. 1 and 2. This embodiment assumes that the output image is to occupy one or more blocks in storage, with each block containing some number of complete image lines and no partial lines. The number of bytes of image data which are to be placed in a particular block is given by the function NB ("number of bytes"). Variables used in the procedure are:

BLKPTR: Pointer to list of block addresses
BLKPT: Pointer addressed by BLKPTR; points to a block
LAST: Pointer to output byte currently being constructed
RPTR: Pointer to white/black run end pair currently being converted
WHITEEND: White run end addressed by RPTR
BLACKEND: Black run end addressed by RPTR
REND: Run end of run being converted
CUM: Output byte being constructed
BITS: Number of image pels (bits) whose values have been determined but not yet stored
LASTBYTE: Output byte addressed by LAST
IC: Number of bits per line (assumed to be a multiple of 8)
T: Temporary value Two tables, SBLACKS and EBLACKS, are used by the conversion. Each contains eight entries with indices running from zero to seven. The entries, in hexadecimal, are:
SBLACKS: FF FE FC F8 F0 E0 C0 80
EBLACKS: 00 01 03 07 0F 1F 3F 7F SBLACKS is used to start a black run after some number of white pels (the white pels are placed in the low-order bits of the output byte because the raster data is constructed moving right to left). It is also used to invert all of the bits except the first (low-order) ones; the index gives the number of bits which are not to be changed. EBLACKS is used to construct the end of a black run; again, the pels in the run occupy the low-order bits in the output byte.

Figure 1:
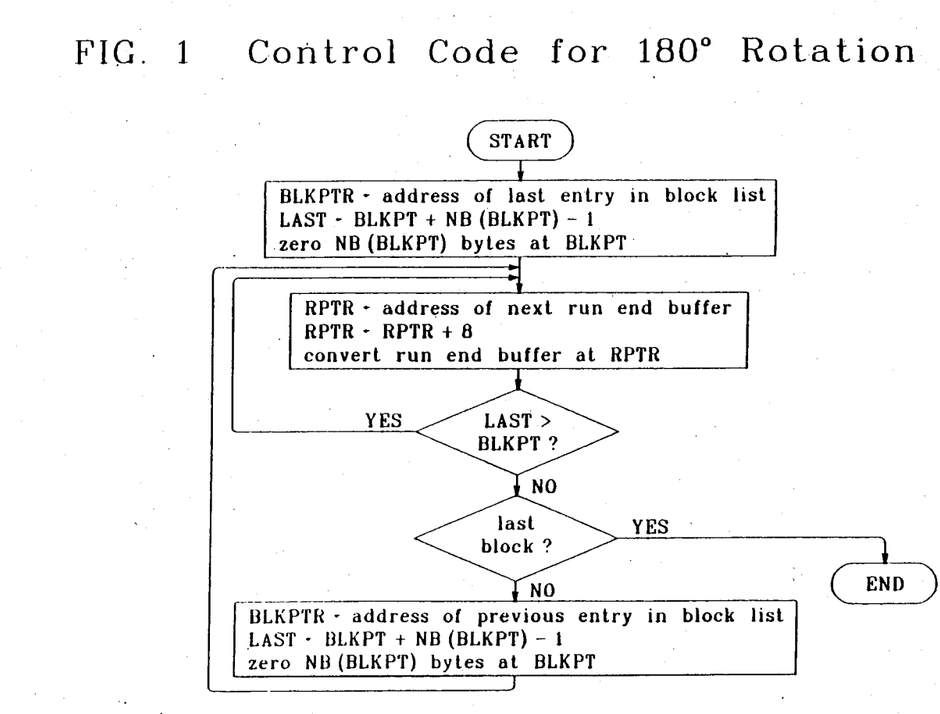
FIG. 1 is a flow chart showing the control code for the conversion/180° rotation procedure according to the present invention.

FIG. 1 shows the control code for the 180° rotation. The end of the block list, i.e. the address of the block which will contain the last lines of the output image, is addressed, and LAST is positioned to point to the last byte in the area which will contain output data. The output area is zeroed so that it will not be necessary to store zero bytes when long white runs are converted.

The loop which converts lines is then entered. A new run end buffer is obtained. At this point it may be desirable to check the run end buffer to ensure that it describes a line containing the correct number of bits. RPTR is then set to address the first white/black run end pair, which is at an offset of eight bytes into the buffer. The line is converted to raster form, decrementing the pointer LAST as each byte is stored. After the line conversion is complete, LAST is compared to the address of the beginning of the current block. If LAST is greater, then there is space to convert another line into the current block, so the loop repeats. Otherwise it is necessary to obtain another block and reset LAST. A test is made to determine whether all of the output blocks have been filled with image data; if so, then processing is complete. Otherwise BLKPTR is altered to address the previous output block, LAST is reset to point to the last byte in the data area of that block, the data area in the block is cleared, and the loop to convert lines is reentered.

Figure 2:
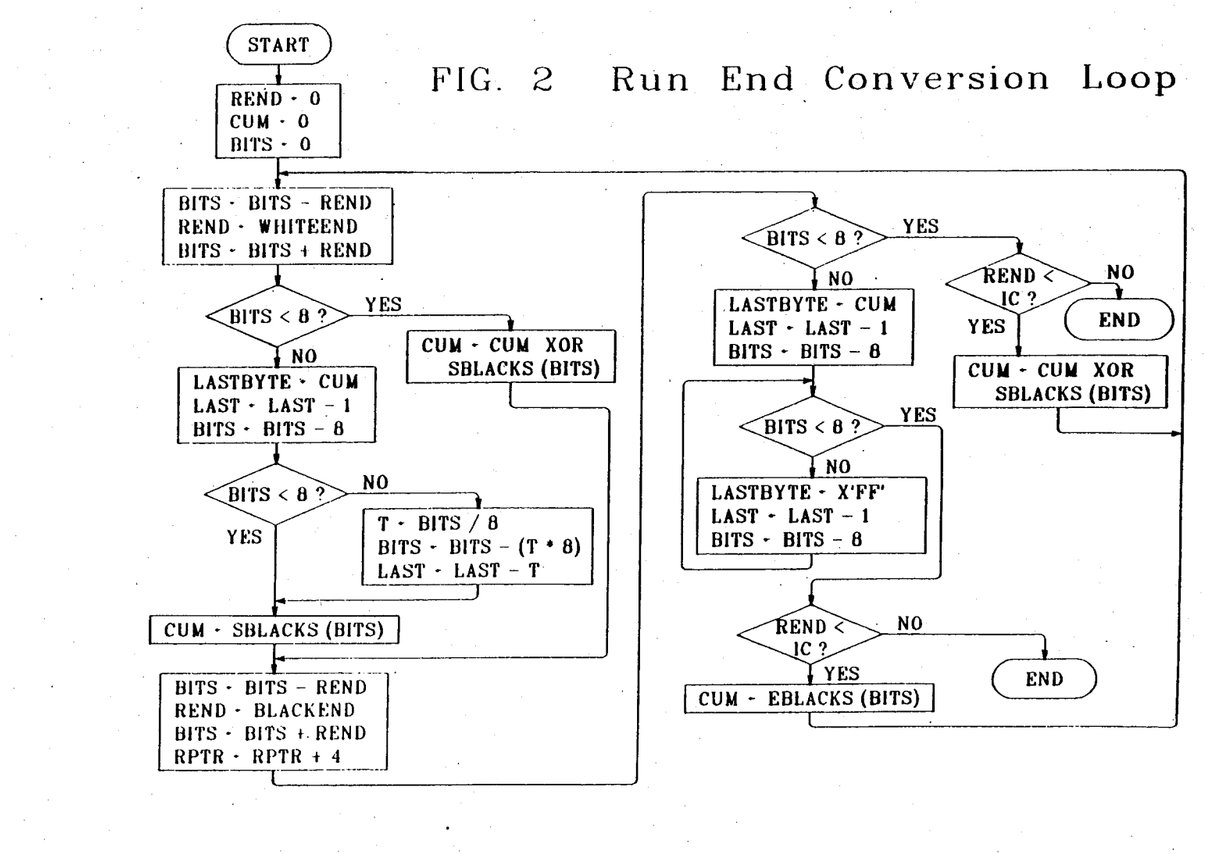
FIG. 2 is a flow chart showing the details of the conversion from run end to raster form for the 180° rotation according to the present invention.

FIG. 2 illustrates the process used to convert one line of run end data to reversed raster form. Initially the previous run end, the current output byte, and the bit count are all set to zero. To convert a white run, BITS is incremented by the length of the white run (the difference between WHITEEND and the old black run end REND), and the white run end is placed in REND. If the total bit count is less than 8, then the bits not yet determined are made black (ones) and control passes to the portion of the code which converts a black run. Otherwise, the current output byte is stored and LAST is backed up to address the previous output byte. The bit counter is decremented by 8 for the byte stored. If the bit count is still not less than 8, then the output run must contain one or more white (zero) bytes. Since the output area was cleared before the line conversion began, it is not necessary to store zero bytes; it is necessary only to back LAST up by the appropriate amount to skip over the bytes, and to reduce the bit counter by the number of bits so skipped over. The current output byte is then set up to contain a number of "leading" (i.e. low-order) zeroes determined by the bit counter, with the rest of the bits black.

To convert a black run, BITS is incremented by the length of the black run (the difference between BLACKEND and the old white run end saved in REND). The run end buffer pointer RPTR is incremented to point to the next white/black run end pair after the black run end has been placed in REND. If the bit count is less than 8, then REND is tested to see if the end of the line has been reached. If so, then the bit count is zero (since the line width is assumed to be a multiple of 8 pels), so there is no more data to store and the line conversion is complete. If the end of the line has not been reached, then the output bits not yet determined are inverted so that they become zeroes (white) and control passes to the code which converts a white run. If the addition of the black run length causes the bit count to be 8 or greater, then the completed output byte in CUM is stored, LAST is backed up to address the next byte, and BITS is decremented by 8 for the eight bits stored. If BITS is still 8 or greater, then some number of black (X'FF') bytes must be placed in the output image. A black byte is stored, LAST is backed up, and BITS is decremented. This cycle repeats until BITS is less than 8. The black run end value is then tested to determine whether the end of the line has been reached; if so, processing is complete. Otherwise, the "leading" bits of the new output byte CUM are made black, and control passes to the code to convert the next white run end.

The 90° rotations are somewhat more complex than the 180° rotation, since the basic unit to be operated on is the (two-dimensional) 8×8 bit block rather than the (one-dimensional) byte and since if the output image is to be split into several blocks, the data from each input line must be split up among all of the output blocks. It is convenient to perform the 90° rotation in two steps: the first step converts the run end data to an intermediate raster format and stores the raster data for each output block as a unit, and the second step rotates the 8×8 bit blocks and constructs the output image. The procedure to be described assumes that all output blocks are the same size, and requires that one extra block be supplied for use as temporary storage.

Figure 3:
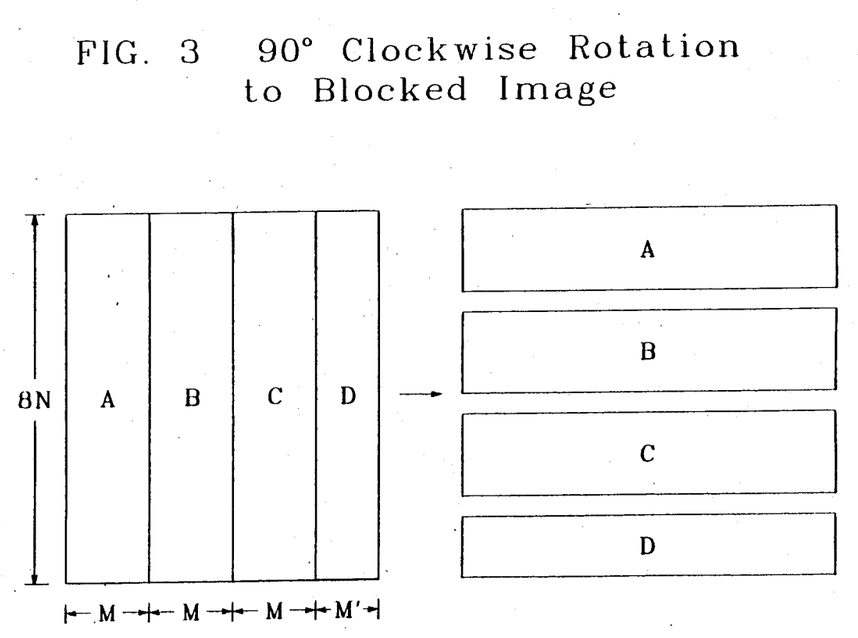
FIG. 3 is a schematic diagram illustrating the operation of a 90° clockwise rotation on an original image to create an output image divided into discontiguous blocks in accordance with the method of the present invention.

FIG. 3 illustrates the operation of a clockwise rotation on an original image to create an output image which may be divided into discontiguous blocks. The number of rows in the original image is padded to a multiple of 8, so that the total number of rows may be expressed as 8N (where N is an integer). Each input line is assumed to contain a number of pels which is divisible by eight. The image is conceptually divided into vertical strips (A, B, C, and D in the figure) of some width M, where M is a number of bytes such that 8NM (the number of bytes in the strip) is less than or equal to the number of bytes available for each output block. In general the image width will not be evenly divisible by M, so the last vertical strip has a width M' which is less than or equal to M. Each vertical strip of the original image can be independently rotated to create a horizontal strip of the output image.

Figure 4:
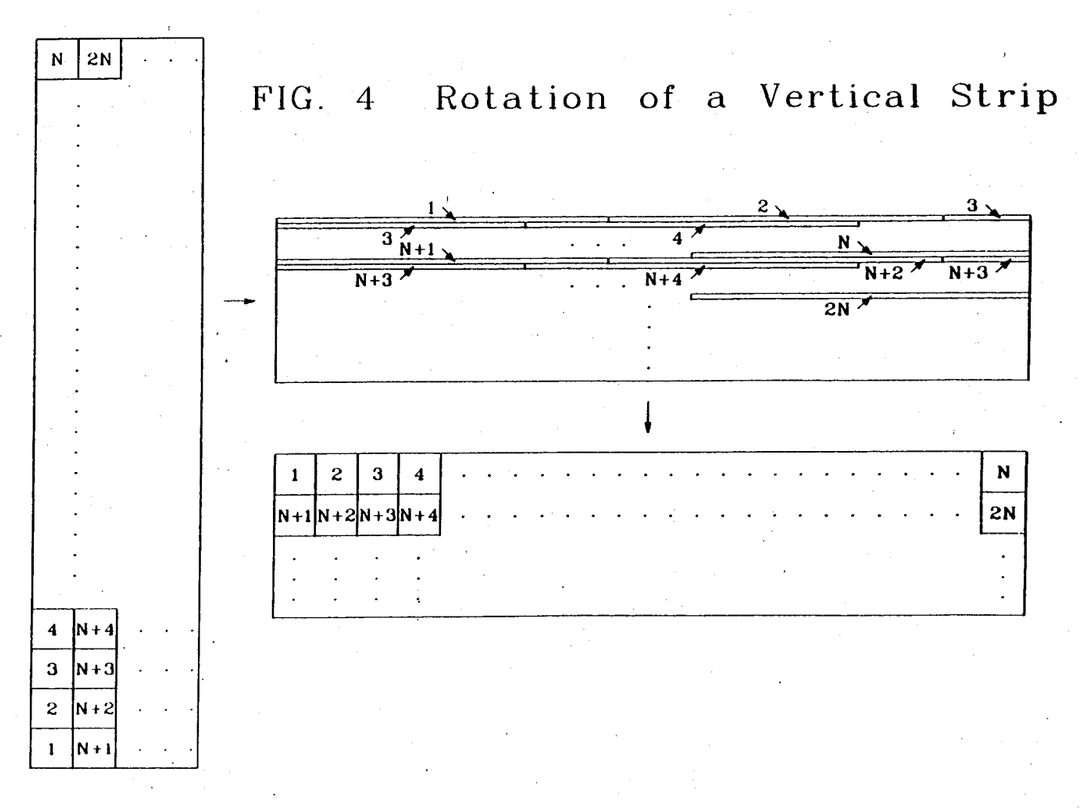
FIG. 4 is a schematic diagram showing the layout of a block of image data in accordance with the present invention at each step of the 90° clockwise rotation process.

FIG. 4 illustrates the (clockwise) rotation of one vertical strip of the original image. The input image strip is represented on the left. Each small square represents an 8×8 bit subunit of the image. Recall that this image exists in run representation form rather than as raster data. The original image is converted to a raster form in which the bytes are arranged in storage as shown in the second rectangle. The image may be converted as described in above-noted U.S. Pat. No. 4,596,039, or other convenient method, but instead of storing the successive bytes in contiguous locations, each byte is stored at an offset of 8N from the previous one. The first byte of the first row is stored at an offset of 8N−1 from the beginning of the buffer; the first byte of the second row is stored at offset 8N−2; and for each succeeding row the position where the first byte is stored is backed up by one byte. Ths result is that the eight bytes forming each 8×8 bit block to be rotated are stored in eight contiguous bytes of the buffer, reading from the bottom of the block to the top. The data can be conveniently picked up and rotated using the table lookup/add procedure described in above-noted copending application Ser. No. 567,214 (with appropriate modifications to compensate for the altered layout of the input bytes), or by some other suitable method, and the resulting eight bytes can be distributed to their proper places in the output image buffer. The rotation of a vertical strip of an image by this method requires a scratch buffer of the same size as the image strip.

To rotate an entire image, each line is converted to raster form with the resulting bytes distributed among several buffers, each of which contains the data from one vertical strip of the original image. After all of the lines have been converted, the data from each buffer is rotated as described above to create a horizontal strip of the output image. Since each strip of the image is processed independently (and nonconcurrently), it is only necessary to have one extra buffer available, since after the data from one buffer is rotated into the extra buffer the first buffer is no longer needed, and so the data from another buffer can be rotated into it.

A detailed description of the clockwise rotation procedure will now be given with reference to FIGS. 5 through 9. Variables used are:

BLKPTR: Pointer to list of block addresses
BLKPT: Pointer addressed by BLKPTR; points to a block
OFFSET: Offset from start of block where first byte of line being converted is to be stored
RPTR: Pointer to white/black run end pair currently being converted
WHITEEND: White run end addressed by RPTR
BLACKEND: Black run end addressed by RPTR
LCOL: Bit offset from start of line of last bit to be stored in current block
LAST: Pointer to output byte currently being constructed
REND: Run end of run being converted
CUM: Output byte being constructed
BITS: Number of image pels (bits) whose values have been determined but not yet stored
NLINES: Number of output lines per output block; assumed to be a multiple of 8
LASTBYTE: Output byte addressed by LAST
IR: Number of lines in input image
IC: Number of bits per input image line
OC: Number of bits per output image line
IPTR: Pointer to intermediate raster data to be rotated
OPTR: Pointer to output image buffer LIM: Pointer to end of input data for one group of 8 lines during rotation step MAX: Pointer to end of data in block during rotation step T: Temporary value The SBLACKS and EBLACKS tables are the reverse of those used in the 180° rotation, since the raster data in the image lines is not to be reversed:

SBLACKS: FF 7F 3F 1F 0F 07 03 01
EBLACKS: 00 80 C0 E0 F0 F8 FC FE

Figure 5:
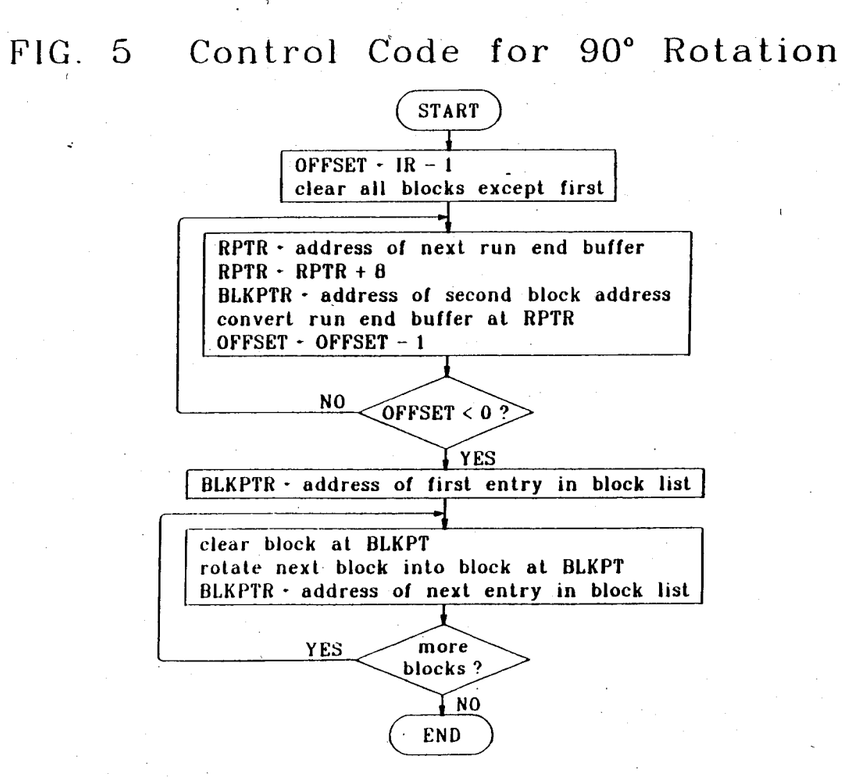
FIG. 5 is a flow chart showing the control code for the conversion/90° rotation procedure according to the method of the present invention.

FIG. 5 shows the control code for the 90° clockwise rotation. OFFSET is initialized to one less than the number of rows, so that it can be backed up one byte per row and place the first byte from row IR at offset zero into a block. All output blocks except the first are zeroed, so that no data need be transferred and stored for long white runs. The first block does not have to be zeroed at this point because it is reserved as the "extra" buffer; no raster data is to be stored in it by the run end conversion process. The loop to convert the original image to raster form is then entered. A run end representation of an image line is obtained; at this point it may be desirable to check to ensure that the data describes a line of the expected width. RPTR is set to point to the first white/black run end pair, which is at an offset of 8 from the beginning of the run end buffer. BLKPTR is initialized to point to the address of the second output block. The image line at RPTR is converted (causing BLKPTR to cycle through all of the output buffers), and OFFSET is decremented by one to prepare for the next line. If OFFSET is not less than zero, there are more lines to convert, so the loop repeats to convert the next line.

After the entire image has been converted to raster form, BLKPTR is set to point to the address of the first block in the block list (which has not been used for anything yet), and a loop is entered which rotates the intermediate raster data from each block into another block. The output block is cleared so that no processing is required for 8×8 bit blocks which are all white. The data from the input block is then rotated into the output block, and BLKPTR is altered to make the input block the output block for the next iteration and to obtain a new input block. If there are more blocks to be rotated, the loop repeats to rotate the next block.

Figure 6:
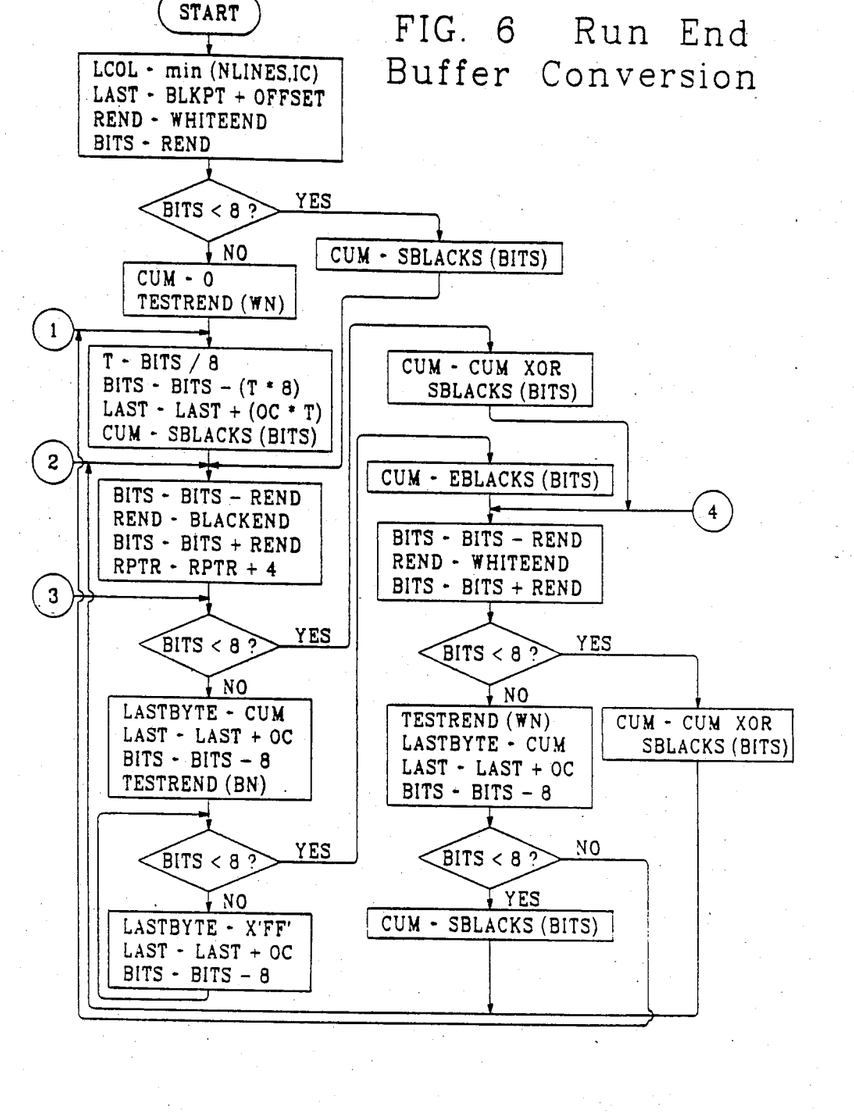
FIG. 6 is a flow chart showing the details of the conversion from run end to raster form for the 90° rotation according to the method of the present invention.

FIG. 6 shows the procedure for converting the run end data to raster form and distributing it among the various output blocks. This procedure is similar to the conversion procedure used in the 180° rotation, but it is complicated by the need to cycle through all of the output blocks (except the first) for each line. It uses the procedure TESTREND to determine when to go and get a new block for the output data. This procedure compares the current run end REND with the maximum run end for the current block LCOL. If REND is not less than LCOL, one of the procedures WN or BN is used to cross a block boundary, depending on what color run is being processed at the time the test is performed. The possible return points from the WN and BN procedures are labelled "1", "2", "3", and "4".

The conversion of a line begins by setting LCOL to the smaller of NLINES (allowing one pel per output line in the block) and the number of pels available in the input line. LAST is initialized to point to the required offset in the intermediate buffer. The first white run end is read into REND and copied to BITS. If there are fewer than 8 bits in the first white run, then CUM is set up with the required number of leading white bits and control passes to the portion of the procedure which converts a black run. It is not necessary to test to see whether a block boundary has been crossed, since this can only happen when an output byte is completed (i.e. the bit counter reaches 8). If there are 8 white bits or more, then CUM is set to zero and a test is made to determine whether the white run end extends over a block boundary. If it does, control passes to the WN procedure. Otherwise, the number of zero bytes in the run is calculated. BITS is decremented by the appropriate number of bits, and LAST is incremented by OC for each white byte. CUM is set with an appropriate number of leading white bits, and processing continues to the portion of the code which converts a black run.

The conversion of a black run begins by adding the run length to BITS. The run length is the difference between the black run end and the old white run end (saved as REND). RPTR is incremented to address the next white/black run end pair after the black run end is read into REND. The bit counter is then tested. If it is less than 8, then the bits not yet determined are inverted (made white) and control passes to the code which converts a white run end. If BITS is not less than 8 then the completed output byte is stored, LAST is incremented to point to the space for the next output byte, the bit counter is decremented for the stored byte, and REND is tested. If a block boundary is crossed before the black run ends, control passes to BN. Otherwise a loop is entered which stores a black byte, increments LAST, and decrements the bit counter until less than 8 bits remain to be set up. CUM is then set to have the appropriate number of leading black bits, and the code to convert a white run is entered.

To convert a white run, the run length is added to BITS. If BITS is less than 8, then the trailing bits of CUM which have not yet been determined are inverted (made black) and control passes to the code which converts a black run. Otherwise a test is required to determine whether a block boundary has been crossed; if so, then control passes to WN. Otherwise the completed byte is stored, LAST is incremented, and BITS is decremented for the stored byte. If BITS is still not less than 8, control goes to the portion of the code which handles a long white run. Otherwise CUM is set up with the appropriate number of leading white bits and processing continues with the conversion of a black run.

Figure 7:
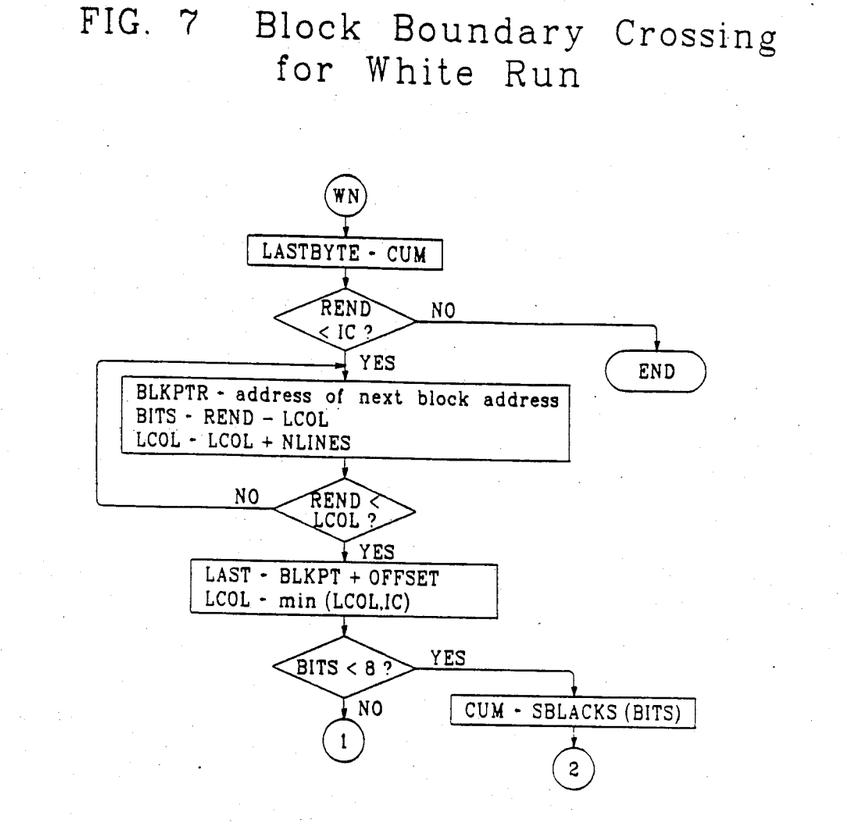
FIG. 7 is a flow chart showing the procedure used when a white run crosses a block boundary according to the present invention.

FIG. 7 shows the procedure WN for crossing a block boundary while a white run is being processed. A completed output byte is first stored. A test is then made to see if the white run extends to the end of the input line; if so, conversion of the line is complete. If there are more runs to convert, a loop is entered to find the block in which the current white run ends. BLKPTR addresses the next input block address, BITS is set to the number of bits in the white run which belong beyond the end of the old block, and LCOL is incremented by the number of input bit columns allowed in a block. If REND is still not less than LCOL, the process is repeated until the correct block is found. LAST is then initialized to point to the byte at the proper offset into the block, and LCOL is reset if it is greater than the number of pels available from the input line. If the bit count is less than 8, CUM is set up with the required number of leading white bits and control goes back into the main loop at the point where processing of a black run begins; otherwise control goes to the code which handles a long white run.

Figure 8:
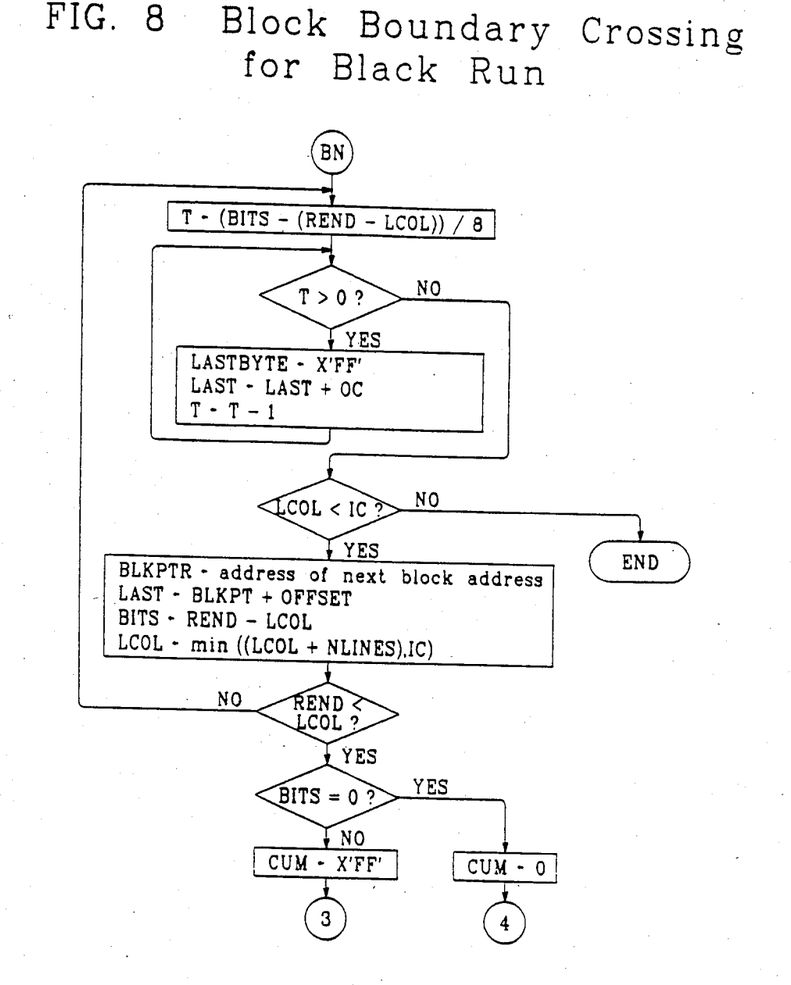
FIG. 8 is a flow chart showing the procedure used when a black run crosses a block boundary according to the present invention.

The procedure BN for crossing a block boundary while processing a black run is shown in FIG. 8. In addition to finding the correct new block, it is necessary to fill in X'FF' bytes in the area skipped. The number of bytes to be filled in the current block is obtained by subtracting the number of bits beyond the current block (REND-LCOL) from the bit counter and dividing by 8 to convert from bits to bytes. (Note that since this procedure is entered from a byte boundary and LCOL is a multiple of 8, the remainder from the division operation will always be zero.) A loop fills in a black byte, increments LAST, and decrements the byte count until there are no more black bytes to be stored. A test is then made to see if the end of the input line has been reached; if so, the conversion of the line is complete. If not, then the next block is addressed, LAST is set up to point to the output byte at the required offset into the block, the bit counter is recalculated as the number of black bits not yet stored, and the column limit LCOL is reset. If REND is still not less than LCOL, then the entire procedure is repeated to fill in all of the appropriate bytes in the new block with black bits. When the block within which the black run ends is found, then the bit counter is tested to see whether it is zero or nonzero. If BITS is nonzero, then CUM is set up with all black bits and control passes to the point in the black run processing after the run end has been read. If BITS is zero, then the new block begins with a white run, so CUM is set to zero and control passes to the code which converts a white run.

Figure 9:
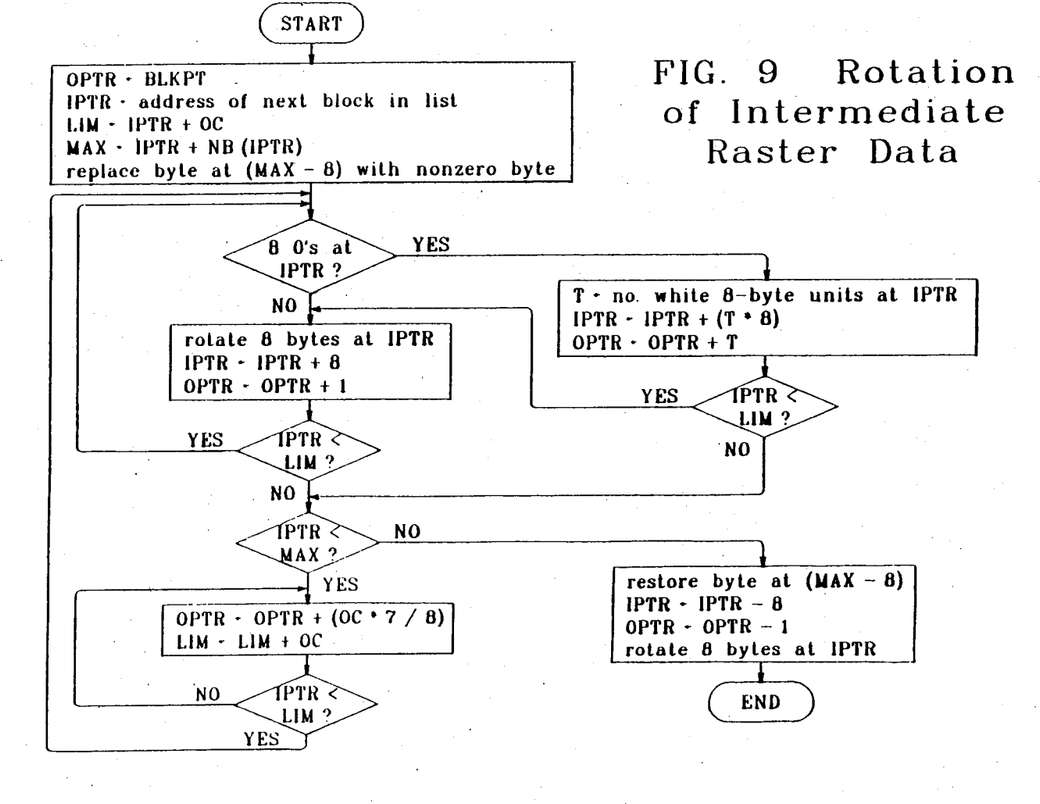
FIG. 9 is a flow chart describing the rotation and reformatting of the intermediate data created by the conversion step of the 90° rotation according to the present invention.

FIG. 9 shows the procedure for rotating the intermediate raster data from one buffer to another. The output and input pointers are set to address the beginnings of the output and input blocks, respectively. The input pointer will step through the input eight bytes at a time, since each series of eight consecutive bytes represents an 8×8 bit block. The output pointer will step through the output buffer one byte at a time, storing the output bytes at positions OPTR+(OC*K/8), where K=0, 1, 2, ... 7. After each complete row of 8×8 bit blocks the output pointer must be incremented by OC*$\frac{7}{8}$ to address the point where the next row is to begin. Two loop limits are therefore required. The first, LIM, indicates when a complete row of 8×8 bit blocks (a "sweep") has been processed. The second limit, MAX, is set to point to the end of the input data in the block to be rotated. The first byte of the last 8×8 bit block represented in the input buffer is saved and replaced with a nonzero byte, allowing a scanning instruction to be used to detect long fields of white bytes without scanning beyond the end of the data.

The main loop of the rotation begins by checking to see if the next eight input bytes are all zeroes. If they are, the input data is scanned to determine the number of 8-byte units which are white. The input pointer is incremented to point to the first unit containing nonzero data, and the output pointer is incremented by the number of blocks skipped. IPTR is then tested to see whether the end of the original sweep has been reached. If the input pointer has passed LIM, then the inner loop is exited to allow the output pointer to be reset. Otherwise control returns to the inner loop, where the eight-byte unit addressed by IPTR is rotated, for example, by using a table lookup procedure similar to that described in above-noted copending application Ser. No. 567,214. The resulting block is stored in the output buffer. The input and output pointers are then incremented to address the next 8×8 bit input unit and the space where the first byte of the output unit is to go. The input pointer is tested to see whether the end of the sweep has been reached. If not, then the loop repeats.

When the inner loop is exited, IPTR is compared to MAX to determine whether the end of the block has been reached. If it has (IPTR <MAX), then the saved byte in the last input unit is restored, the input and output pointers are backed up, and the last 8×8 bit unit is rotated and stored in the output buffer. This completes the rotation of the block.

If the end of the block has not been reached, then OPTR is incremented by OC*$\frac{7}{8}$ to address the appropriate offset from the beginning of the next sweep. LIM is updated to point to the end of the input data for that sweep. If IPTR is not less than the new LIM, then the sweep contains all zero data, so the loop repeats to try the next sweep. When the correct sweep is found, the inner loop is reentered to continue rotating data.

The mechanics of a counterclockwise rotation differ in detail but not in concept from the clockwise rotation procedure just described. In the conversion step, the blocks are addressed in reverse order, OFFSET begins at zero for the first input line and counts up to IR−1, and LAST begins in the last sweep of the temporary block and backs up toward the beginning of the block. The control structure for the rotation step is unchanged, but bytes in the units of eight input bytes progress from the top of an 8×8 bit block to the bottom instead of from the bottom to the top.

Figure 10:
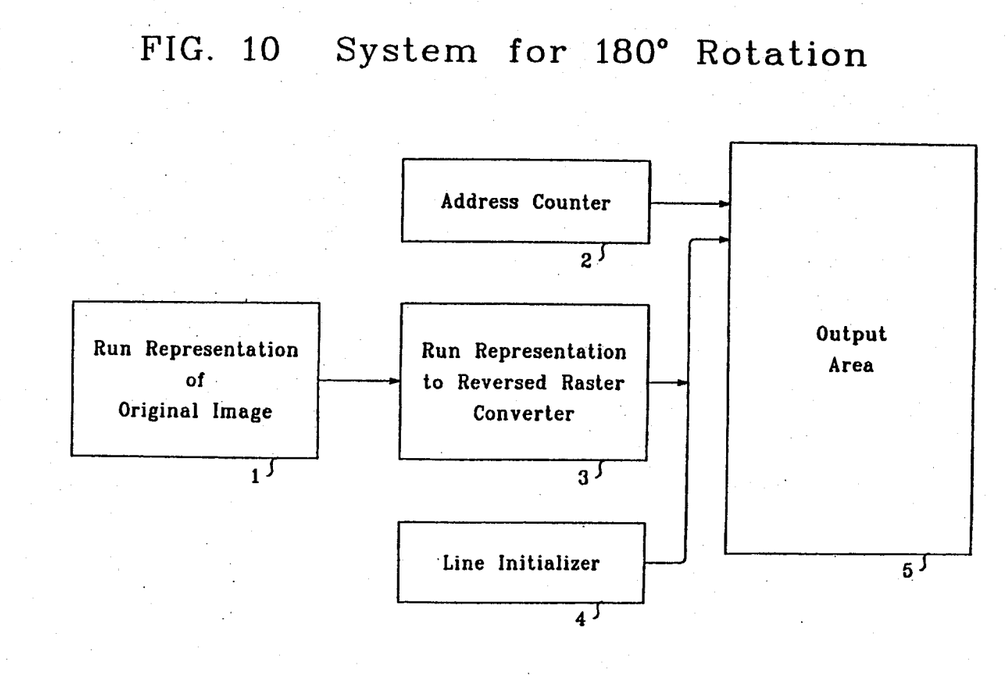
FIG. 10 is a block diagram of a system for rotating an image in run representation form by 180° in accordance with the present invention.
Figure 11:
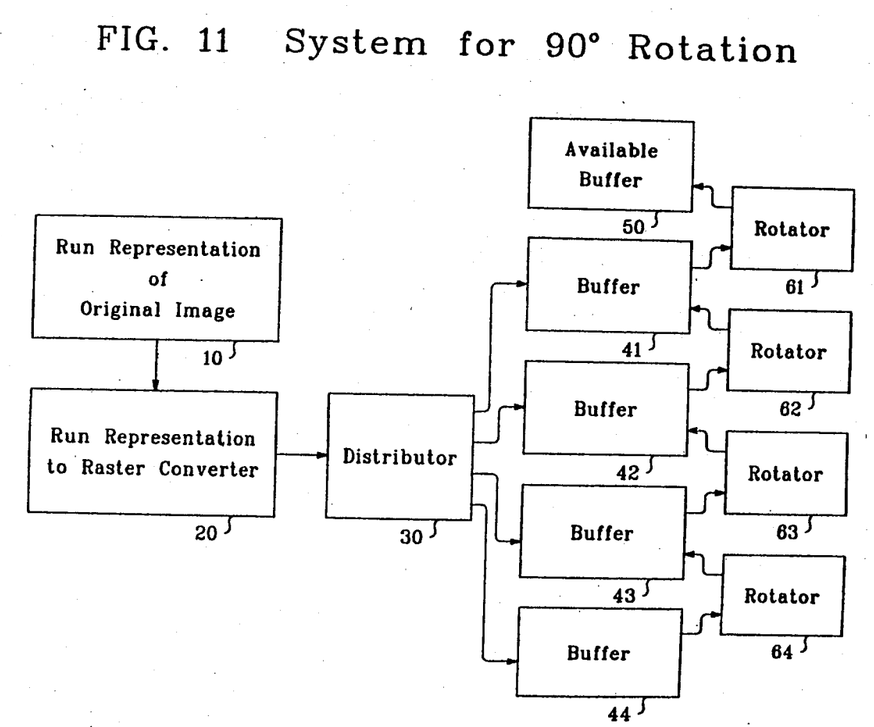
FIG. 11 is a block diagram of a system for rotating an image in run representation form by 90° in accordance with the present invention.

FIGS. 10 and 11 illustrate systems for rotation of an image in run representation form through 180° and 90°, respectively.

In the system of FIG. 10 a buffer 1 stores lines of the image to be rotated, in run representation form. These lines are converted sequentially by the process of activating a line initializer 4, which performs the initialization necessary to store the line at the address specified by an address counter 2, and then activating a converter 3, which creates a raster representation of the line of image data with the bits in reverse order and stores it in the output buffer 5 under control of the address counter 2. The address counter 2 causes the reversed image lines to be stored beginning with the last line of the rotated image and working back toward the beginning of the output buffer 5, at which point the last line of the original image will be stored (in reverse order) as the first line of the rotated image.

In the system of FIG. 11, a first buffer 10 stores lines of the image to be rotated, in run representation form. These lines are sent to a converter 20 which creates a raster representation of the image data. The resulting raster data is distributed by the distributor 30 among one or more other buffers, here illustrated as the four buffers 41, 42, 43, and 44. When all of the lines of the original image have been converted and distributed, the rotation process begins. The raster data from the buffer 41 is rotated and stored in an available buffer 50 by a rotator 61. The information in the buffer 41 is then no longer needed, so this buffer can be used as an available buffer for the rotation of the raster data in buffer 42 by rotator 62. The process continues with the contents of buffer 43 rotated into buffer 42 by rotator 63 and the contents of buffer 44 being rotated into buffer 43 by rotator 64.

Alternatively, the system may be equipped with a single rotator which can switch between the various buffers, so that any buffer can be used for input or output as required.

The proposed invention is designed to run on IBM System/370 processors, but it will be within the purview of those skilled in the art to recode the procedure for operation on other general-purpose computers in the light of the foregoing descriptions. It will also be understood that the terms "vertical"/"horizontal" and "columns"/"rows" are used in the description to conveniently indicate lines or strips oriented at right angles to each other and do not necessarily describe their orientation with respect to another reference.

Having thus described our invention, what we claim as new and desire to secure by Letters Patent is:

1. A method for rotation of an image in run end or run length form by 180° from the orientation of the original image to create an image in raster form, comprising the steps of: beginning at a first end of an original image representation and a second end of an output image area; storing a plurality of run representations of a line of said original image in a buffer; initializing a line of output data; converting each run representation in said buffer to a picture element representation in which the bits read in the opposite direction from the line described by the run representations; storing said picture element representation of said line; repeating the steps of storing, initializing, converting, and storing for remaining lines of said original image, progressing from said second end of the output image to said first end and from said first end of the original image to said second end, until said original image has been converted to a bit map representation rotated 180° in the output image area.

2. A method as in claim 1, in which said initializing step includes the step of setting all bits in the output area to zero.

3. A method as in claim 1, in which said initializing step includes the step of testing an output pointer to determine whether a discontinuity in the output image storage area has been reached, and in that case resetting said pointer to address the next section of the output image area.

4. A method as in claim 1, in which said first end of said original image is the upper left hand corner of said original image and said second end of the output image area is the lower right hand corner of said output image area.

5. A method for converting an image in run end or run length form into an image in raster form rotated 90° from the orientation of the original image, comprising the steps of: initially storing a plurality of run representations of a first bit row of said original image in a first buffer; converting said run representations to data in raster form; distributing the data obtained by said conversion into at least one other buffer; repeating said steps of storing, converting, and distributing on successive contiguous bit rows of said original image until all the bit rows of the original image have been converted and stored in raster representation in said at least one other buffer; rotating a first block containing a portion of each of a plurality of bit columns of said original image from said stored data in a first one of said at least one other buffer into a first available buffer; repeating said step of rotating on successive blocks containing additional portions of each of a plurality of bit columns of said original image until all of the data stored in said first one of said at least one other buffer has been rotated such that a plurality of contiguous bit columns of said original image are stored as contiguous bit rows of the rotated image in said first available buffer; and repeating said steps of rotating and repeating on successive blocks into successive available buffers until all the stored data in said at least one buffer has been rotated such that contiguous bit rows of said original image are stored as contiguous bit columns, whereby said original image can be read out oriented 90° with respect to its initial stored orientation.

6. A method as in claim 5, including the further step of zeroing said at least one other buffer used by said conversion step before any run representations are converted.

7. A method as in claim 5, in which said distributing step creates said blocks by storing consecutive horizontally adjacent original image bytes at intervals of N bytes within each said at least one other buffer, where N is the number of bits in a line of the original image, and storing consecutive vertically adjacent original image bytes in consecutive bytes within each said at least one other buffer.

8. A method as in claim 7, in which said rotating and repeating steps comprise positioning a first pointer at one end of a buffer containing stored data and a second pointer at the same end of an available buffer; rotating the 8×8 bit block formed by the eight consecutive bytes addressed by said first pointer; storing the bytes of the rotated block at intervals of M bytes beginning at the point addressed by said second pointer, where M is the number of bytes in a line of the output image; incrementing said first and second pointers by 8 and 1, respectively; testing said second pointer to determine whether it has reached an offset of some multiple of M bytes from the beginning of the available buffer, and in that case incrementing said second pointer by 7M; repeating said rotating, storing, incrementing, and testing steps until all blocks in the buffer containing stored data have been rotated.

9. A method as in claim 8, in which said rotating step further comprises setting all bits in said available buffer to zero before rotating data into said available buffer.

10. A method as in claim 9, in which said rotating step further comprises scanning for long fields of zero input bytes and omitting the rotation of 8×8 bit blocks which contain all zero bits.

11. A system for rotation of an image in run end or run length form by 180° from the orientation of the original image to create an image in raster form, comprising: buffer means for containing run representation data of an original image; means for providing an output image area; means for beginning at a first end of an original image representation and a second end of said output image area; means for storing a plurality of run representations of a line of said original image in said buffer means; means for initializing a lineof output data; means for converting each run representation in said buffer means to a picture element representation in which the bits read in the opposite direction from the line described by the run representations and storing said picture element representation of said line in said output image area; means for repeating the steps of storing, initializing, converting, and storing for remaining lines of said original image, progressing from said second end of the output image to said first end and from said first end of the original image to said second end, until said original image has been converted to a bit map representation rotated 180° in the output image area.

12. A system as in claim 11, in which said means for initializing comprises means for setting all bits in the output area to zero.

13. A system as in claim 11, in which said means for initializing comprises means for testing an output pointer to determine whether a discontinuity in the output image storage area has been reached, and in that case resetting said pointer to address the next section of the output image area.

14. A system as in claim 11, in which said first end of said original image is the upper left hand corner of said original image and said second end of the output image area is the lower right hand corner of said output image area.

15. A system for converting an image in run end or run length form into an image in raster form rotated 90° from the orientation of the original image, comprising: a first buffer; at least one other buffer; at least one available buffer; means for initially storing a plurality of run representations of a first bit row of said original image in said first buffer; means for converting said run representations to data in raster form; means for distributing the data obtained by said conversion into said at least one other buffer; means for repeating said steps of storing, converting, and distributing on successive contiguous bit rows of said original image until all the bit rows of the original image have been converted and stored in raster representation in said at least one other buffer; means for rotating a first block containing a portion of each of a plurality of bit columns of said original image from said stored data in a first one of said at least one other buffer into a first one of said at least one available buffer; means for repeating said step of rotating on successive blocks containing additional portions of each of a plurality of bit columns of said original image until all of the data stored in said first one of said at least one other buffer has been rotated such that a plurality of contiguous bit columns of said original image are stored as contiguous bit rows of the rotated image in said first one of said at least one available buffer; and means for repeating said steps of rotating and repeating on successive blocks into successive available buffers until all the stored data in said at least one other buffer has been rotated such that contiguous bit rows of said original image are stored as contiguous bit columns, whereby said original image can be read out oriented 90° with respect to its initial stored orientation.

16. An apparatus as in claim 15, further comprising means for zeroing said at least one other buffer used by said conversion step before any run representations are converted.

17. A system as in claim 15, in which said distributing means comprises means for creating said blocks by storing consecutive horizontally adjacent original image bytes at intervals of N bytes within each said at least one other buffer, where N is the number of bits in a line of the original image, and storing consecutive vertically adjacent original image bytes in consecutive bytes within each said at least one other buffer.

18. A system as in claim 17, in which said means for rotating and repeating comprises means for positioning a first pointer at one end of one of said at least one other buffer containing stored data and means for positioning a second pointer at the same end of said one of said at least one available buffer; means for rotating the $8 \times 8$ bit block formed by the eight consecutive bytes addressed by said first pointer and storing the bytes of the rotated block at intervals of M bytes beginning at the point addressed by said second pointer, where M is the number of bytes in a line of the output image; means for incrementing said first and second pointers by 8 and 1, respectively; means for testing said second pointer to determine whether it has reached an offset of some multiple of M bytes from the beginning of the available buffer, and in that case incrementing said second pointer by 7M; means for repeating said rotating, storing, incrementing, and testing steps until all blocks in said buffer containing stored data have been rotated.

19. A system as in claim 18, in which said means for rotating and repeating further comprises means for setting all bits in said available buffer to zero before rotating data into said available buffer.

20. A system as in claim 19, in which said means for rotating and repeating further comprises means for scanning for long fields of zero input bytes and omitting the rotation of $8 \times 8$ bit blocks which contain all zero bits.

* * * * *